UNITED STATES PATENT OFFICE.

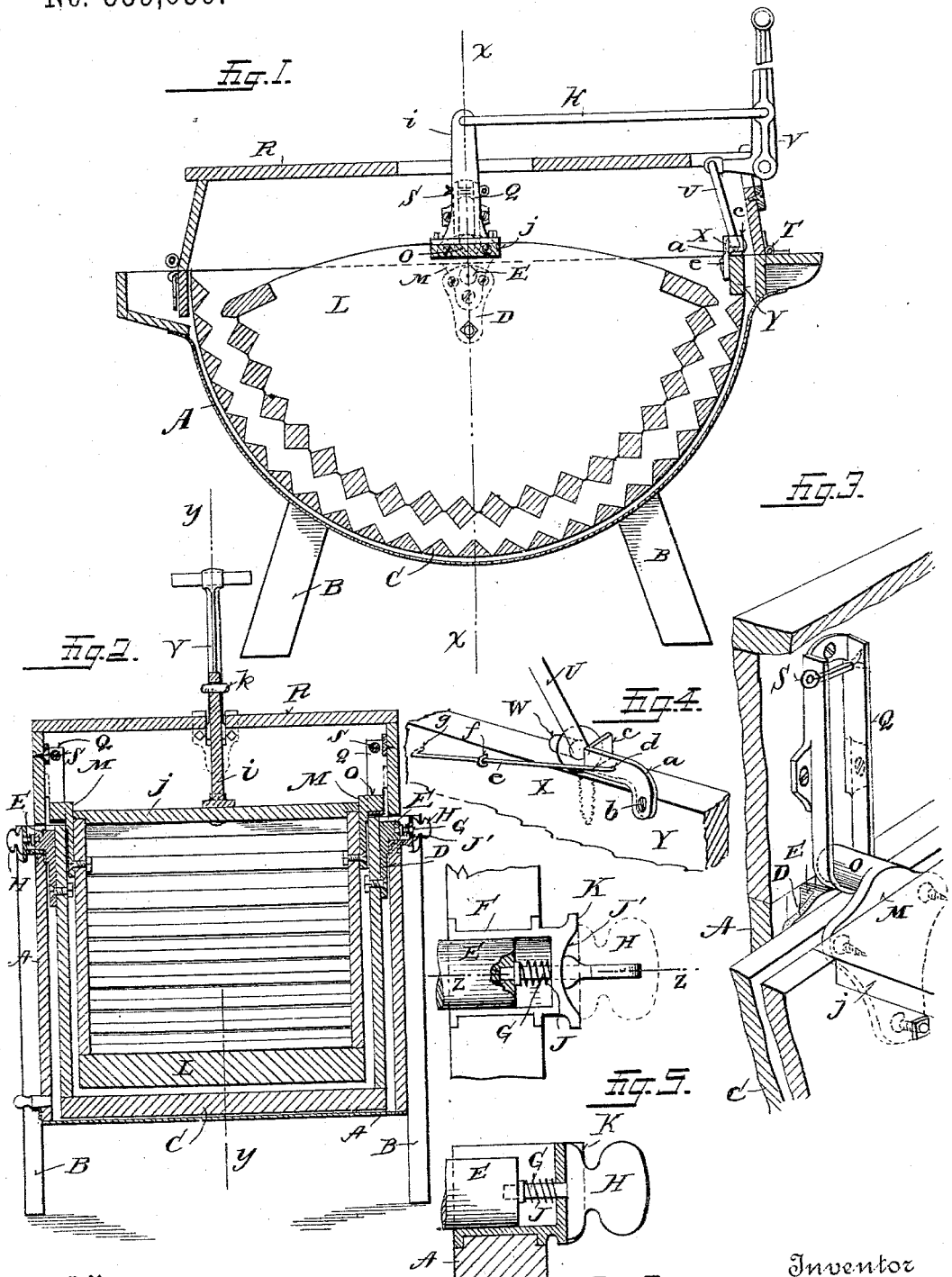

JACOB BANY, OF ST. HENRY'S, OHIO, ASSIGNOR OF ONE-HALF TO JACOB J. BANY, OF SAME PLACE.

WASHING-MACHINE.

SPECIFICATION forming part of Letters Patent No. 559,659, dated May 5, 1896.

Application filed September 26, 1895. Serial No. 563,755. (No model.)

*To all whom it may concern:*

Be it known that I, JACOB BANY, a citizen of the United States, residing at St. Henry's, in the county of Mercer and State of Ohio, have invented certain new and useful Improvements in Washing-Machines, of which the following is a specification, reference being had therein to the accompanying drawings.

This invention relates to certain new and useful improvements in washing-machines.

My improvements have reference to a new construction of bearing and retaining device for holding the shaft of one of the moving rubbers in the bearing and allowing it to be detached to remove the rubber for cleansing; have reference to an improved bearing for the other rubber in the machine, whereby the latter rubber may rise and fall in the operation of washing without riding out of its bearings, and yet may be withdrawn from its bearings; and have reference to an improved locking device for holding the pitman of one of the rubbers in engagement with the eye in which the pitman is adapted to fit, but which lock will permit of the quick withdrawal of the pitman from the eye when it is desired to remove the rubber for cleansing; and the machine as an entirety, as will hereinafter be fully described, and pointed out in the claim.

In the accompanying drawings, on which like reference-letters indicate corresponding parts, Figure 1 is a vertical sectional view, on the line *y y* of Fig. 2, of a washing-machine embodying my improvements; Fig. 2, a transverse sectional view on the line *x x* of Fig. 1; Fig. 3, a perspective view in detail, looking toward the interior of the cover, the two rubbers, and their shafts and bearings; Fig. 4, a detail perspective view of one of the rubbers, its operating-pitman, and the devices for locking the pitman; Fig. 5, a detail view in plan of the bearing of one of the rubbers and the retaining device therefor, and Fig. 6 a sectional view of the same on the line *z z* of Fig. 5.

The letter A designates the casing of the washing-machine, mounted on legs B, and having within it a swinging clothes-rubber C. The sides of the rubber have secured to them a metal plate D with a shaft or trunnion E, and the sides of the casing have bearing-boxes F fitted thereto, as shown. These bearing-boxes receive within them the trunnions or shafts E, so that the rubber can swing or vibrate. The boxes are left open at the top to permit the trunnions to be lifted out of them in the act of removing the rubber to cleanse the interior of the casing; but it is desired to hold these trunnions down in the boxes against the tendency of the rubber to float when water is put into the machine, and thus lift the trunnions out of the boxes. To hold them in, I have provided a retaining device consisting of a pintle G, mounted in the end of the box, and having a thumb-piece H by which to manipulate it. The ends of the pintles enter a socket in the ends of the trunnions, and a spring J acts to keep each pintle in the socket. The outer end of the box F is concaved, so as to leave an inner surface J, against which the inner end of the thumb-piece will rest when the pintle is in the socket, and so as to leave an outer surface K, upon which the thumb-piece is made to ride by rotating it with the hand, as indicated by the dotted lines in Fig. 5, whereby the pintle is held out of the socket. This concave, with the surfaces J and K, forms virtually a cam, upon which the thumb-piece rides and against which it fits. When the rubber is to be removed, the thumb-pieces are adjusted to the outer cam-surfaces K.

The next feature I would refer to is the means for mounting the inner rubber L, which consists of plates M, secured to the sides of said rubber and having shafts or trunnions O, which fit in boxes Q, secured to the inner sides of the top or cover R of the machine. These boxes Q have their lower ends formed in half a circle to fit the trunnions O, and constitute a long channel from the lower end upward, where they are closed by a pin or device S. Thus the inner rubber may rise and fall according to the water and quantity of clothes in the machine, and yet to be lifted out of the machine when the cover is thrown back on its hinge T, and may also be entirely removed by withdrawing the pins S from the boxes Q.

The third feature of my invention consists of the locking device for the pitman U, by which the outer rubber is vibrated. This pitman is connected to a bell-crank lever V, pivoted to the top R, and has its lower end turned to form a projection W, which enters an eyebolt X, secured to the cross-strip Y of the rubber C. It is desired to hold this pitman projection in the eyebolt when the machine is operated, but to quickly withdraw the projection from the eyebolt when the rubber C is to be tilted an unusal distance or entirely removed. Thus I provide a lock consisting of a tumbler $a$, pivoted at $b$, and having a wing $c$ and a hole $d$. A spring rod or wire $e$ enters the hole $d$ and holds down on the tumbler, being itself held by a staple $f$ and an inturned end $g$, driven into the end strip Y. To remove the pitman U, the spring $e$ is sprung out of the hole $d$ and the tumbler $a$ is thrown back. When the pitman is again inserted in the eyebolt, the tumbler is dropped down against the pitman and the spring reinserted in the hole $k$. The lever V has a pitman $k$ connected to it and engaging with an arm or standard $i$, secured to a cross-strip J of the rib L, so that this rubber may also be vibrated.

Having thus fully described my invention, what I claim as new, and desire to secure by Letters Patent, is—

In a washing-machine, the combination with a casing having open bearing-boxes constructed with cam-surfaces, and a retaining device consisting of a pintle extending through the end of the box with a thumb-piece adapted to fit the cam-surface, and a spring drawing the thumb-piece up against such surface, of a rubber having shafts fitted to said open boxes and recessed to receive the inner end of the pintle.

In testimony whereof I affix my signature in presence of two witnesses.

JACOB BANY.

Witnesses:
OLIVER H. MILLER,
W. M. McNAIR.